(12) United States Patent
Konkle et al.

(10) Patent No.: US 10,775,256 B2
(45) Date of Patent: Sep. 15, 2020

(54) CALIBRATABLE TIRE GAUGE AND SYSTEM

(71) Applicants: Jeffery Lee Konkle, Chicago, IL (US); Robert R. Bauer, Chicago, IL (US); Daniel C. Swanson, Chicago, IL (US); Karolina Stus, Chicago, IL (US)

(72) Inventors: Jeffery Lee Konkle, Chicago, IL (US); Robert R. Bauer, Chicago, IL (US); Daniel C. Swanson, Chicago, IL (US); Karolina Stus, Chicago, IL (US)

(73) Assignee: MILTON INDUSTRIES, INC., Chicago, IL (US)

( * ) Notice: Subject to any disclaimer, the term of this patent is extended or adjusted under 35 U.S.C. 154(b) by 79 days.

(21) Appl. No.: 16/215,938

(22) Filed: Dec. 11, 2018

(65) Prior Publication Data
US 2020/0182729 A1 Jun. 11, 2020

(51) Int. Cl.
*G01L 17/00* (2006.01)
*G01M 17/02* (2006.01)
(Continued)

(52) U.S. Cl.
CPC ............ *G01L 27/002* (2013.01); *G01L 17/00* (2013.01); *G01L 27/02* (2013.01)

(58) Field of Classification Search
CPC .. G01M 17/02; G01M 17/021; G01M 17/022; G01M 17/027; G01M 17/025; G01M 17/024; G01M 17/10; G01M 7/08; G01M 17/0076; G01M 17/013; G01M 17/03; G01M 17/04; G01M 17/06; G01M 17/08; G01M 1/02; G01M 1/045; G01M 1/12; G01M 1/225; G01M 3/04; G01M 3/40; G01M 5/0091; G01M 7/02; G01M 99/00; G01M 99/002; B60C 23/0494; B60C 2019/004; B60C 23/0493; B60C 23/064; B60C 19/00; B60C 23/04; B60C 23/0488; B60C 23/0498; B60C 23/0496; B60C 23/0408; B60C 23/041; B60C 23/0411; B60C 23/20; B60C 11/246; B60C 23/0486; B60C 23/06; B60C 23/061; B60C 11/243; B60C 99/00; B60C 11/0083;
(Continued)

(56) References Cited

U.S. PATENT DOCUMENTS 5,554,803 A * 9/1996 Huang .................... G01L 17/00
73/146.8
5,644,074 A * 7/1997 Huang .................... G01B 3/28
116/34 R
(Continued)

*Primary Examiner* — Andre J Allen
(74) *Attorney, Agent, or Firm* — Justin Lampel

(57) ABSTRACT

The present calibratable tire gauge has a first unit nose piece and a second unit nose piece located partially within a main outer enclosure of the gauge. A clicker mechanism located may allow a user to utilize a special tool to 'unlock' the second unit nose piece with respect to the first unit nose piece and immobilize the second unit nose piece with respect to the main outer enclosure. Once 'unlocked', a user may twist the scale bar of the gauge to move the first unit nose piece independent from the second unit nose piece. As a result, the measured pressure on the scale bar is altered as a result of the 'read' line being lowered or raised with respect to the main outer enclosure.

11 Claims, 10 Drawing Sheets

(51) Int. Cl.
*G01L 27/00* (2006.01)
*G01L 27/02* (2006.01)

(58) Field of Classification Search
CPC .......... B60C 13/003; B60C 2009/2038; B60C 23/004; B60C 23/02; B60C 23/0401; B60C 23/0406; B60C 23/0416; B60C 23/0433; B60C 23/0455; B60C 23/0459; B60C 23/0474; B60C 23/0489; B60C 23/0491; B60C 25/002; B60C 25/005; B60C 25/007; B60C 29/02; B60C 3/04; B60C 99/006; B60C 11/0332; B60C 11/24; B60C 13/001; B60C 13/02; B60C 15/0036; B60C 17/02; B60C 2009/0071; B60C 2009/2022; B60C 2200/02; B60C 2200/06; B60C 2200/065; B60C 23/00; B60C 23/001; B60C 23/003; B60C 23/007; B60C 23/008; B60C 23/0413; B60C 23/0427; B60C 23/0447; B60C 23/0454; B60C 23/0457; B60C 23/0462; B60C 23/0471; B60C 23/0472; B60C 23/0476; B60C 23/0479; B60C 23/0484; B60C 23/065; B60C 23/066; B60C 23/10; B60C 25/0548; B60C 25/056; B60C 25/132; B60C 25/138; B60C 29/005; B60C 9/005; B60C 9/18; B60C 9/1807; B60C 9/20; B60C 9/28; G01L 17/00; G01L 17/005; G01L 19/0645; G01L 19/147; G01L 1/16; G01L 1/18; G01L 7/187; G01L 9/0052; G01L 9/008
USPC .................................................. 73/146–146.8
See application file for complete search history.

(56) References Cited

U.S. PATENT DOCUMENTS

| | | | | |
|---|---|---|---|---|
| 5,939,627 | A * | 8/1999 | Huang | G01L 17/00 73/146.8 |
| 7,458,270 | B2 * | 12/2008 | Kiefer | B60S 5/043 73/146 |
| 2005/0204807 | A1 * | 9/2005 | Tseng | G01L 17/00 73/146 |
| 2005/0252284 | A1 * | 11/2005 | Wu | G01L 17/00 73/146 |
| 2007/0068239 | A1 * | 3/2007 | Chen | G01L 17/00 73/146.5 |

* cited by examiner

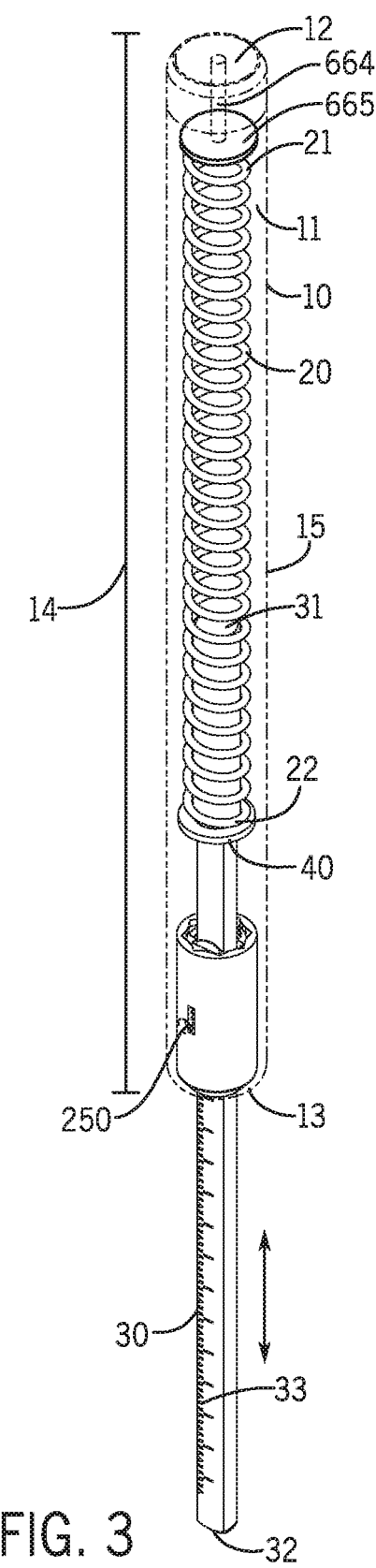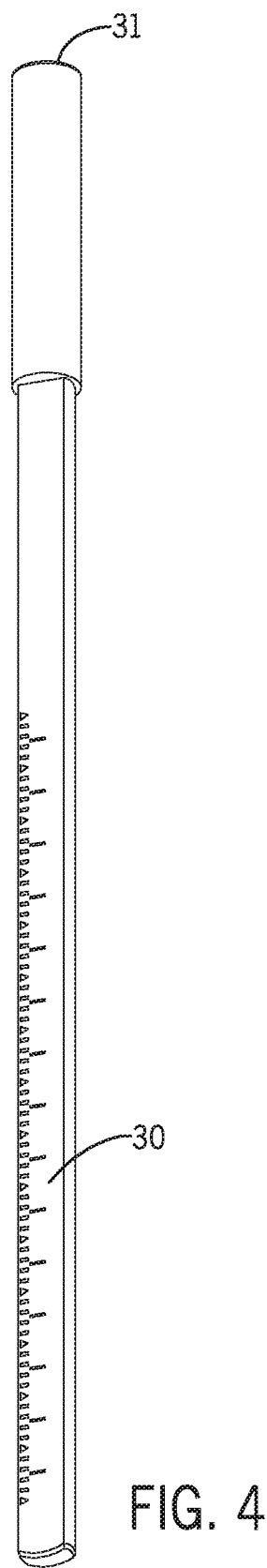
FIG. 3
FIG. 4

CALIBRATABLE TIRE GAUGE AND SYSTEM

BACKGROUND OF THE INVENTION

A calibratable tire gauge and system is provided. The present calibratable tire gauge has a first unit nose piece and a second unit nose piece both located at least partially within a main outer enclosure of the gauge. The two piece nose unit of the present calibratable tire gauge may allow the tire gauge to be easily and accurately calibrated in the field. A clicker mechanism located within the tire gauge may allow a user to utilize a, for example, special tool to 'unlock' the second unit nose piece with respect to the first unit nose piece and to immobilize the second unit nose piece with respect to an inner wall of the main outer enclosure. Once the first unit nose piece is 'unlocked' from the second unit nose piece, a user may twist the scale bar of the gauge to move the first unit nose piece independent from the second unit nose piece. Movement of the first unit nose piece independently with respect to the second unit nose piece therein moves only the first unit nose piece vertically up or down with respect to the bottom of the main outer enclosure of the gauge. As a result, the measured pressure on the scale bar is altered as a result of the 'read' line being lowered or raised with respect to the main outer enclosure. The gauge can therefore be easily calibrated in the field.

Calibratable tire gauges are known. For example, U.S. Pat. No. 7,197,919 to Wu discloses a pressure gauge for operative engagement with a gas pressurized system such as a pneumatic tire. It includes a housing having a pressurized gas inlet orifice and a cylindrical bore formed within the housing. A pressure reactive piston is slidably engaged within the cylindrical bore, and a resistance means is disposed within the cylinder to provide a resistive force to the movement of the piston. A calibration rod is disposed proximate the piston, whereby movement of the piston will cause movement of the rod. A pressure indicator bar, which is threadably engaged to the rod, provides an indication of the pressure level of the gas. The calibration rod has a user accessible end, and rotation of the rod causes a calibration adjustment of the pressure indicator bar due to the threaded engagement of the rod with the pressure indicator bar.

Further, U.S. Pat. No. 5,939,627 to Huang discloses a tire pressure gauge having a tubular housing, a pressure measuring head connected to one end of the tubular housing, a pressure responsive piston provided inside the tubular housing and biased by a spring towards a pressure inlet hole of the pressure measuring head, and a plunger actuated by the piston and having a portion that extends out of the other end of the tubular housing. An adjustable extension member, which is disposed between the piston and the plunger, is connected to the plunger to adjust the length of the outwardly extending portion of the plunger or to correct the position of the graduations provided on the plunger relative to a pointing end of the tubular housing where a detected pressure is read. Preferably, the adjustable extension member is a screw member which is threadedly connected to the plunger. Adjustment or correction can be made before or after assembly by turning the screw member relative to the plunger.

Still further, U.S. Pat. No. 4,768,460 to Soon-Fu discloses a pen-like tire gauge having a barrel body shaped as a pen, a guide cylinder secured in the barrel body, a plunger slidingly moving in the cylinder and carrying a semi-cylindrical scale having graduations marked thereon to dispose around the guide cylinder and resiliently tensioned by a restoring spring inserted in a bore of the barrel body, and an air adapter adapted to connect a tire inflating valve for measuring air pressure in the tire when the air is directed into the cylinder to force the plunger and to move the scale for its pressure reading and measurement through a transparent window formed on the body.

However, these patents fail to describe a calibratable tire gauge which is easy to use. Further, these patents fail to provide for a calibratable tire gauge which allows for easy calibration in the field.

SUMMARY OF THE INVENTION

A calibratable tire gauge and system is provided. The present calibratable tire gauge has a first unit nose piece and a second unit nose piece both located at least partially within a main outer enclosure of the gauge. The two piece nose unit of the present calibratable tire gauge may allow the tire gauge to be easily and accurately calibrated in the field. A clicker mechanism located within the tire gauge may allow a user to utilize a, for example, special tool to 'unlock' the second unit nose piece with respect to the first unit nose piece and to immobilize the second unit nose piece with respect to an inner wall of the main outer enclosure. Once the first unit nose piece is 'unlocked' from the second unit nose piece, a user may twist the scale bar of the gauge to move the first unit nose piece independent from the second unit nose piece. Movement of the first unit nose piece independently with respect to the second unit nose piece therein moves only the first unit nose piece vertically up or down with respect to the bottom of the main outer enclosure of the gauge. As a result, the measured pressure on the scale bar is altered as a result of the 'read' line being lowered or raised with respect to the main outer enclosure. The gauge can therefore be easily calibrated in the field.

Prior art gauges create adjustability by calibrating the scale bar by adjusting the scale bar relative to the piston, which in turn, changes the relative position of the scale bar to the bottom end of the body of the gauge. In contrast, the present gauge reverses that in that the present gauge does not attempt to change the adjustability of the scale bar relative to the piston, but instead the present gauge allows for adjustment of the bottom end (or 'read' line) of the gauge instead. A pressure differential creates an inertial moment that moves a piston and the scale bar (the piston and the scale bar movement is initially resisted by the spring) and the scale bar then comes to a resting point yielding a measurement relative to the bottom of the first unit nose piece of the gauge.

An advantage of the present calibratable tire gauge is that the present calibratable tire gauge may be easily calibrated in the field.

Another advantage of the present calibratable tire gauge is that the present calibratable tire gauge may be calibrated by inserting, for example, a specialized tool into the outer enclosure of the gauge, therein preventing the accidental adjustment of the gauge.

Yet another advantage of the present calibratable tire gauge is that the present calibratable tire gauge prevents the free spinning of the scale bar from inadvertently moving the gauge out of calibration and instead ensures that the gauge is only adjusted when desired.

Still another advantage of the present calibratable tire gauge is that the present calibratable tire gauge allows for a 'quick click' calibration.

For a more complete understanding of the above listed features and advantages of the present calibratable tire gauge reference should be made to the detailed description and the drawings. Further, additional features and advantages of the invention are described in, and will be apparent from, the detailed description of the preferred embodiments.

BRIEF DESCRIPTION OF THE DRAWINGS

FIG. 3 illustrates a view of the interior of the calibratable tire gauge.

FIG. 4 illustrates a perspective view of the scale bar of the tire gauge.

DETAILED DESCRIPTION OF THE PREFERRED EMBODIMENTS

Figure 1:
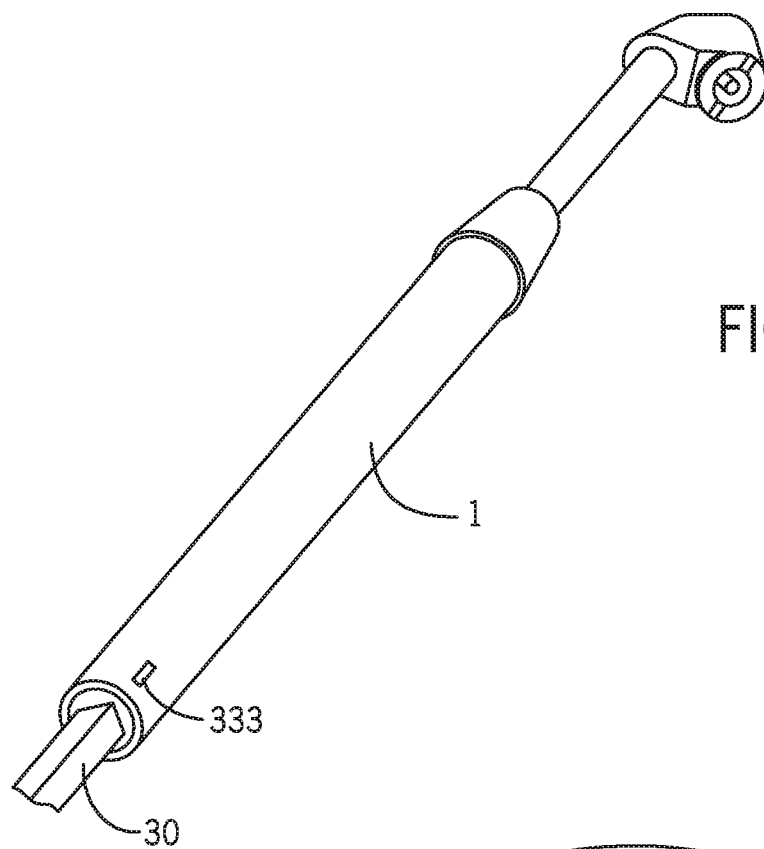
FIG. 1 illustrates a perspective view of the present calibratable tire gauge.
Figure 2:
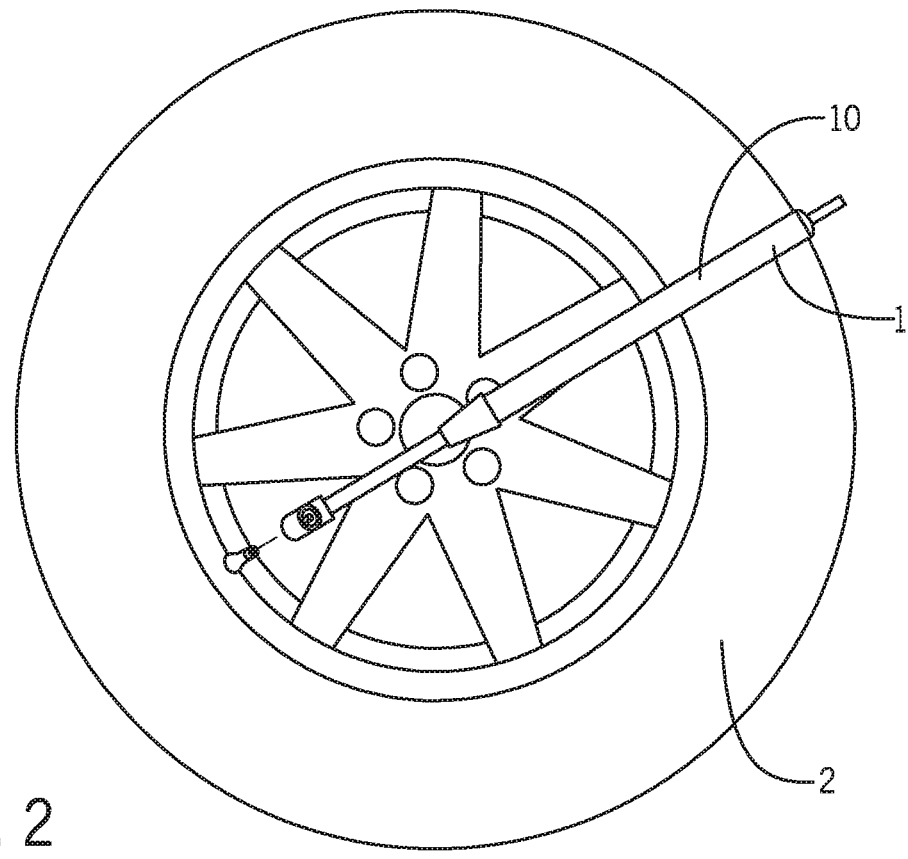
FIG. 2 illustrates a view of the calibratable tire gauge just prior to being used with a tire.
Figure 5:
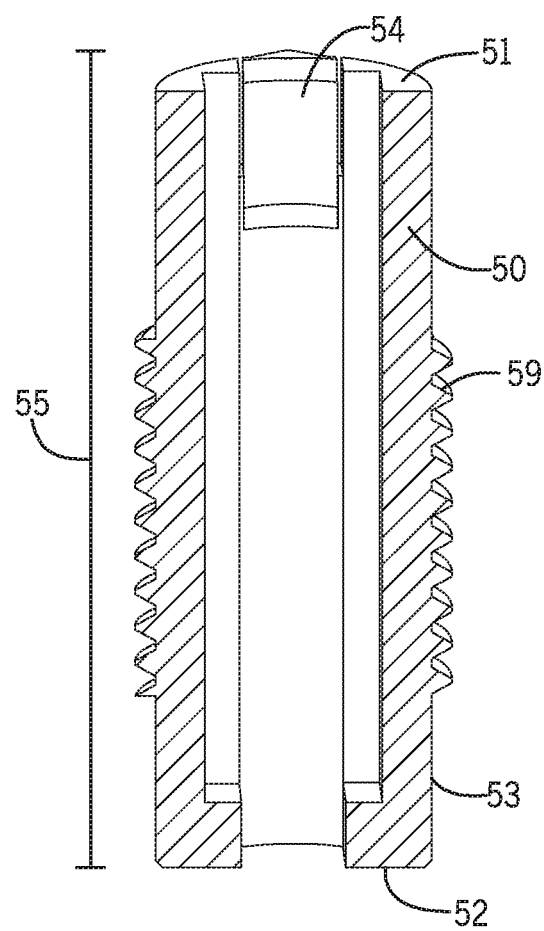
FIG. 5 illustrates a cross-sectional view of the first unit nose piece of the calibratable tire gauge.
Figure 6:
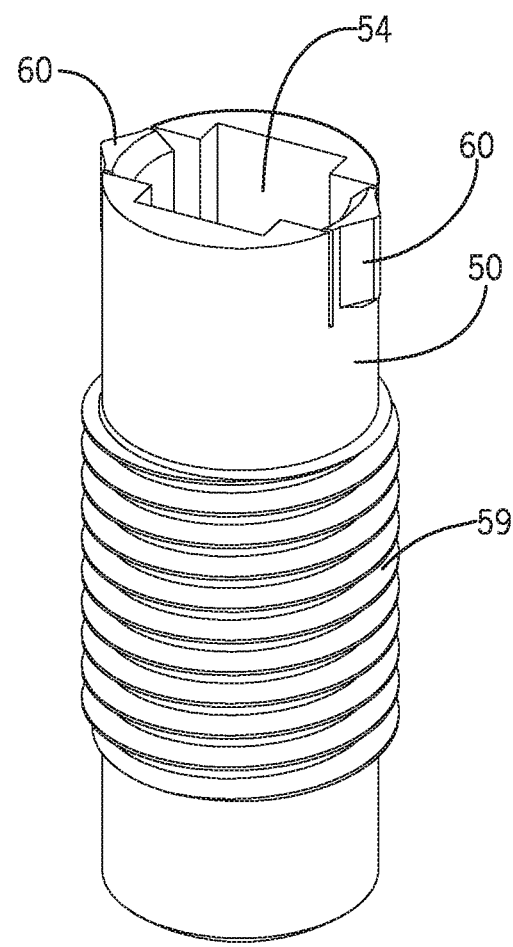
FIG. 6 illustrates a perspective view of the first unit nose piece of the present calibratable tire gauge.

A calibratable tire gauge and system is provided. The present calibratable tire gauge has a first unit nose piece and a second unit nose piece both located at least partially within a main outer enclosure of the gauge. The two piece nose unit of the present calibratable tire gauge may allow the tire gauge to be easily and accurately calibrated in the field. A clicker mechanism located within the tire gauge may allow a user to utilize a, for example, special tool to 'unlock' the second unit nose piece with respect to the first unit nose piece and to immobilize the second unit nose piece with respect to an inner wall of the main outer enclosure. Once the first unit nose piece is 'unlocked' from the second unit nose piece, a user may twist the scale bar of the gauge to move the first unit nose piece independent from the second unit nose piece. Movement of the first unit nose piece independently with respect to the second unit nose piece therein moves only the first unit nose piece vertically up or down with respect to the bottom of the main outer enclosure of the gauge. As a result, the measured pressure on the scale bar is altered as a result of the 'read' line being lowered or raised with respect to the main outer enclosure. The gauge can therefore be easily calibrated in the field.

A calibratable tire gauge 1 for checking the air pressure of a tire 2 is provided. The calibratable tire gauge 1 may have a plurality of components including a main outer enclosure 10 wherein the main outer enclosure 10 has an interior 11. The main outer enclosure 10 may have a first end 12, a second end 13 and a length 14. In one embodiment, the main outer enclosure 10 may be cylindrical having a cylindrical side 15.

Located within the main outer enclosure 10 may be a spring 20 wherein the spring 20 has a first end 21 and a second end 22. In an embodiment, the second end 22 of the spring 20 may contact a washer 40 wherein the washer 40 prevents the downward movement of the spring 20. The top end of the spring 21 may contact a piston 664 and a second washer 665.

A scale bar 30 may move vertically with respect to the main outer enclosure 10 (and both nose pieces) so that a first end 31 of the scale bar 30 always remains within the interior 11 of the main out enclosure 10 while a second end 32 of the scale bar 30 always remains outside of the main outer enclosure 10. The scale bar 30 may have a plurality of indicia 33 which indicates, for example, a recorded pressure of a tire 2.

The gauge 1 may have a first unit nose piece 50 and a second unit nose piece 100. The first unit nose piece 50 may have a top 51, a bottom 52 and a generally cylindrical side 53 wherein the generally cylindrical side 53 has a plurality of threads 59 along a portion of the generally cylindrical side 53. Located on the top 51 of the first unit nose piece 50 may be an opening 54 which extends through the entire length 55 of the first unit nose piece 50 forming a channel. In an embodiment, the opening 54 may be generally rectangular in shape so to receive the similar shaped scale bar 30 which may be rectangular. It should be noted that the opening 54 may be of alternative shapes, such as square or another shape, which prevents rotation of the scale bar 30 within and with respect to the first unit nose piece 50 (ie—a non-circular opening). The rectangular shape of the opening 54 of the first unit nose piece 50 thus forces the scale bar 30 and the first unit nose piece 50 to rotate in unison. In an embodiment, the top 51 of the first unit nose piece 50 may have a first and a second extended portion 60. The figures illustrate triangular-shaped extended portions 60; however it should be understood that alternative designs may be utilized.

Figure 7:
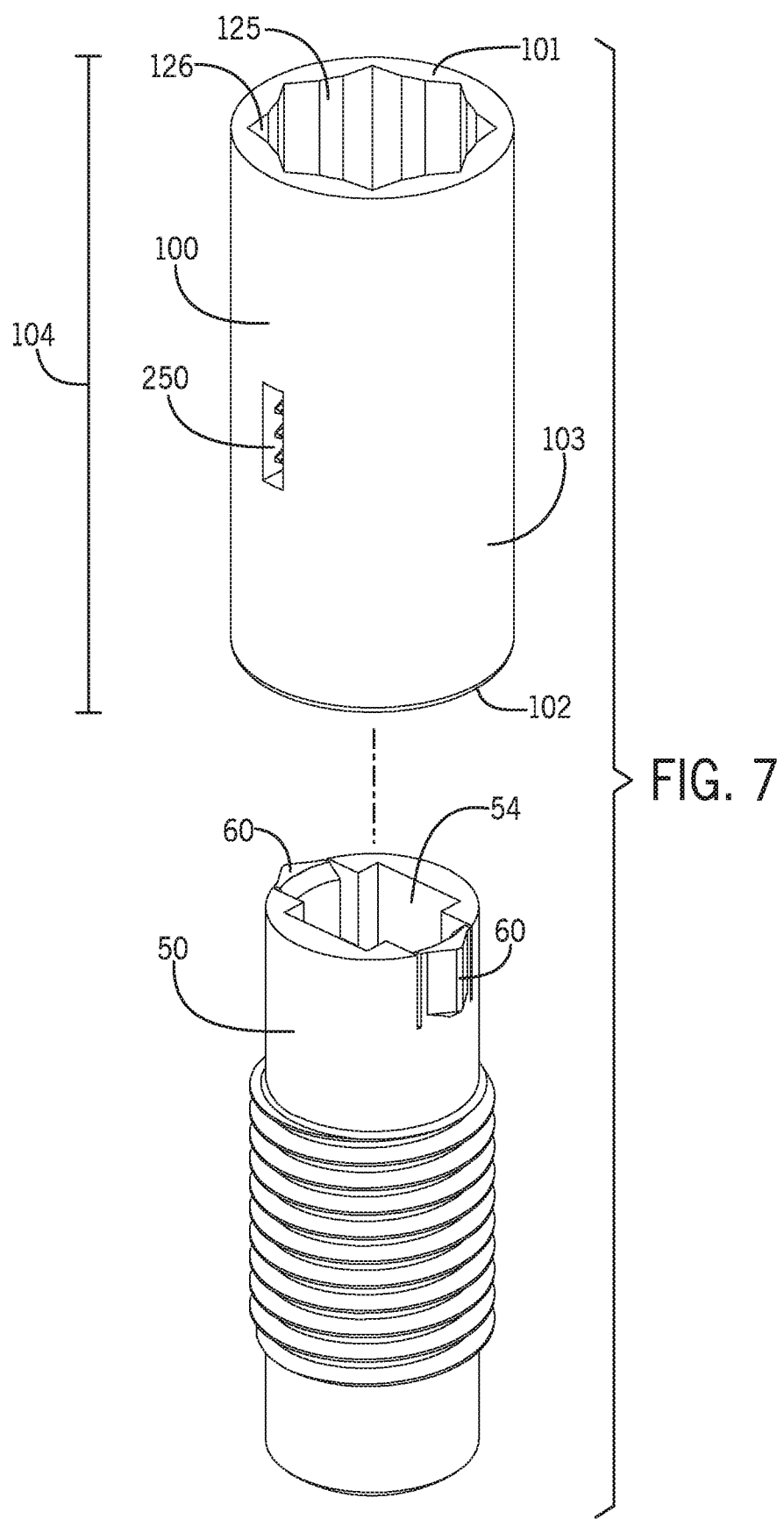
FIG. 7 illustrates an exploded view of the first unit nose piece and the second unit nose piece of the present calibratable tire gauge.
Figure 8:
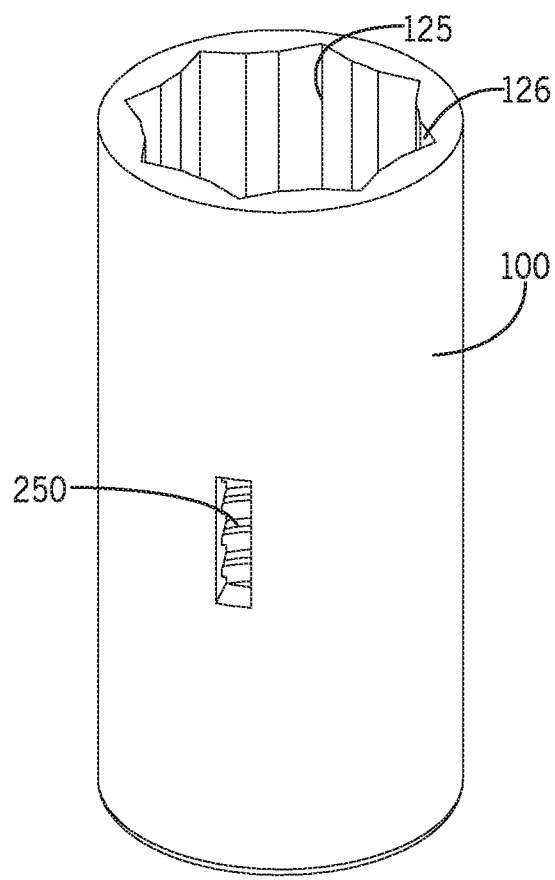
FIG. 8 illustrates a perspective view of the second unit nose piece of the present calibratable tire gauge.
Figure 11:
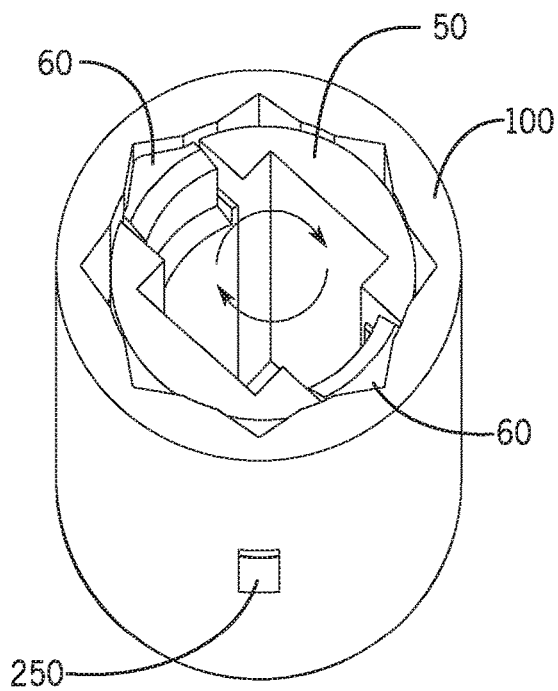
FIG. 11 illustrates a perspective view of the first unit nose piece located within the second unit nose piece of the present calibratable tire gauge wherein the first unit nose piece is in a first position.
Figure 12:
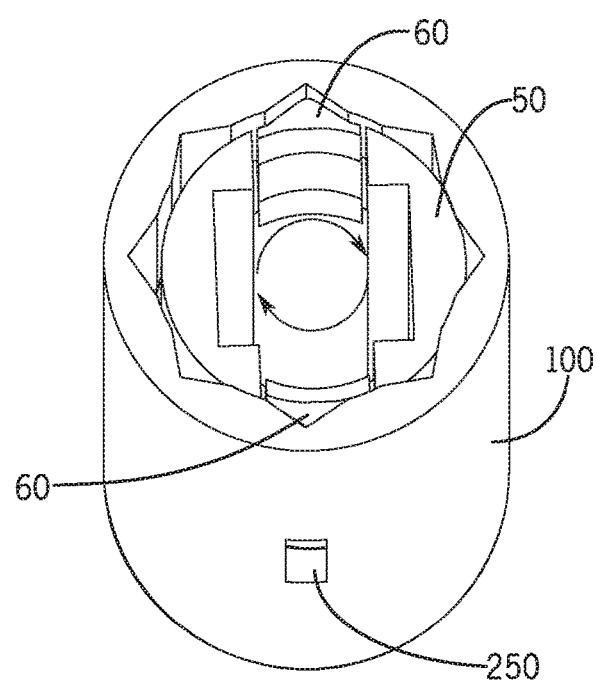
FIG. 12 illustrates a perspective view of the first unit nose piece located within the second unit nose piece of the present calibratable tire gauge wherein the first unit nose piece has rotated into a second position.

In an embodiment, the second unit nose piece 100 may have a top 101, a bottom 102, a generally cylindrical side 103 and a length 104. The top 101 of the second unit nose piece 100 may have an opening 125 (FIG. 7). In an embodiment, the opening 125 may extend downward completely through the second unit nose piece 100 forming a channel. The opening 125 at the top 101 of the second unit nose piece 100 may be, for example, star or octagonal-shaped having a plurality of generally triangular points 126. In an embodiment, the extended protrusions 60 of the first unit nose piece 50 may align with and be inserted into various generally triangular points 126. In an embodiment, the first unit nose piece 50 may have, for example, two extended protrusions 60 which may be located on opposite sides of the first unit nose piece 50. The extended protrusions 60 may be inserted into, for example, two of the generally triangular points 126 (as shown in FIGS. 11 and 12) so that the first unit nose piece 50 and second unit nose piece 100 remain "loosely locked" to each other via friction.

Figure 13:
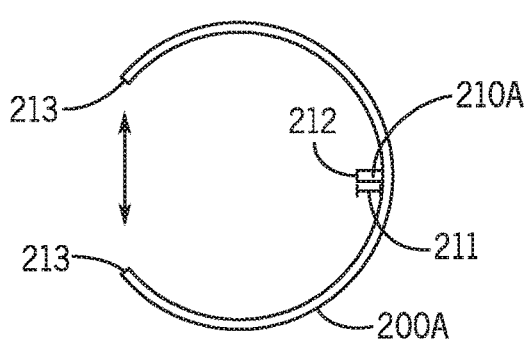
FIG. 13 illustrates top view of the specialized tool of the calibratable tire gauge.
Figure 14A:
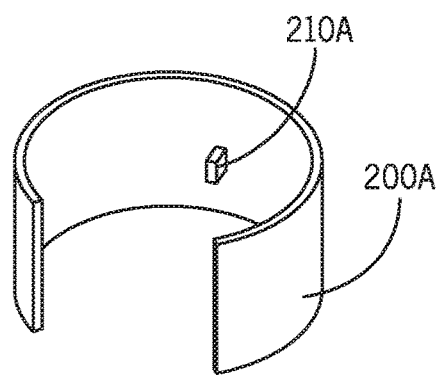
FIG. 14A illustrates a perspective view of a first embodiment of the specialized tool of the calibratable tire gauge.

The tire gauge 1 is designed so that when, for example, a specialized tool 200A (FIGS. 13, 14A and 14B) having an extended peg 210A or 210B is inserted into an opening 333 on the main outer enclosure 10 and further extending partially through an opening 250 on the second unit nose piece 100, the interior first unit nose piece 50 may be rotated with respect to the exterior second unit nose piece 100. The extended peg 210A or 210B has a length 211 which is long enough to completely pass through the opening 333 of the main outer enclosure 10 and to then have its end 212 terminate actually within the opening 250 space of the second unit nose piece 100. When the specialized tool 200A or 200B is locked onto the main outer enclosure 10, the second unit nose piece 100 cannot rotate when the scale bar 30 is twisted, but the first unit nose piece 50 can rotate as a result of the extended peg 210A or 210B not having a long enough length 211 to contact the first unit nose piece 50. More specifically, when the peg 210A or 210B is partially within the opening 250 of the second nose piece unit 100 the peg 210A or 210B prevents the second unit nose piece 100 from rotating while still allowing the first unit nose piece 50 to rotate.

When the specialized tool 200A or 200B is inserted onto the gauge 1, the manual rotating or twisting of the scale bar 30 allows the triangular extended protrusions 60 of the first unit nose piece 50 overcome friction and move from the current triangular points 126 of the second unit nose piece 100 from which the triangular extended protrusions 60 currently sits, therein allowing the first unit nose piece 50 to rotate independent of the second unit nose piece 100.

Figure 14B:
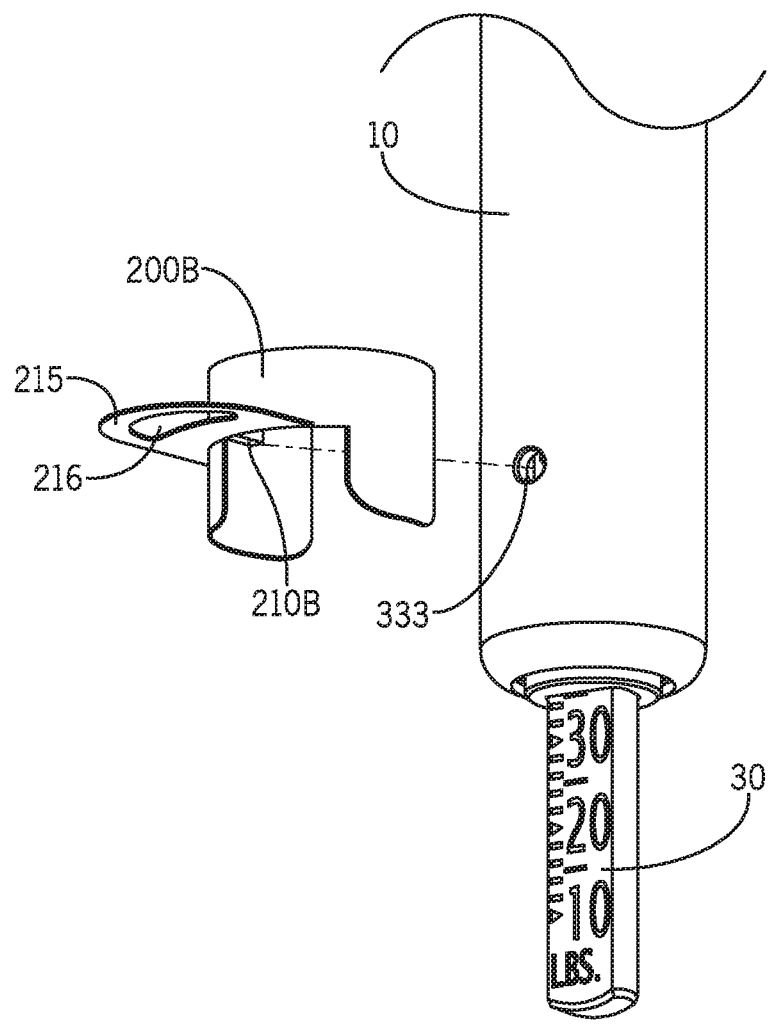
FIG. 14B illustrates a perspective view of a second (or "preferred") embodiment of the specialized tool for the calibratable tire gauge in the process of being inserted onto the gauge.
Figure 14C:
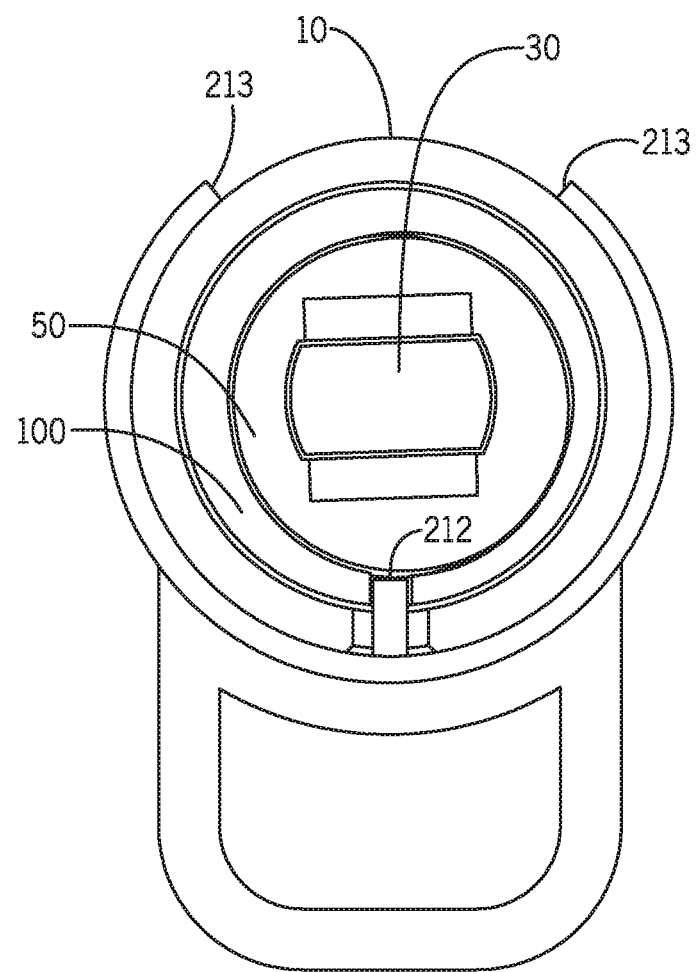
FIG. 14C illustrates a cross-sectional view of the specialized tool secured to the main outer enclosure.
Figure 15:
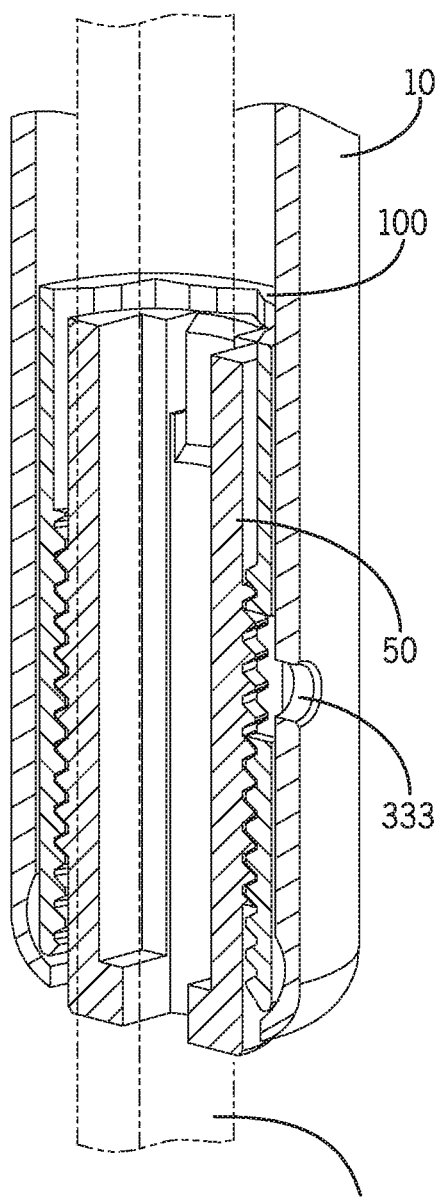
FIG. 15 illustrates a perspective cross-sectional view of the first unit nose piece and the second unit nose piece.

FIG. 14B illustrates a second (and the preferred embodiment) of the specialized tool 200B. In an embodiment, the second embodiment of the specialized tool 200B may also have an extended lip portion 215 having an opening 216. The extended lip portion 215 may extend, for example, at a right angle from the front of the specialized tool 200B. The extended lip 215 may allow a user to more easily grasp the specialized tool 200B to insert or remove the specialized tool 200B from the main outer housing 10 of the gauge 1. The opening 216 may allow a user to hang the specialized tool 200B from a key chain.

The specialized tool 200A or 200B may be slightly bendable similar to a spring clip. As a result, a user may slightly pull the ends 213 of the specialized tool 200A or 200B apart to insert the specialized tool 200A or 200B around the main outer enclosure 10. In an embodiment, simply pressing the specialized tool 200A or 200B onto the main outer enclosure 10 spreads the specialized tool 200A and 200B sufficiently. The user does not need to pull the ends of the specialized tool 200A or 200B apart to use the specialized tool 200A or 200B. The spring nature of the specialized tool 200A or 200B then results in the specialized tool 200A or 200B grasping onto the main outer enclosure 10 and being secured onto the main outer enclosure 10 by friction. As a result, the specialized tool 200A or 200B may allow calibration of the tire gauge 1 without the user having to hold the specialized tool 200A or 200B in his/her hand. Therefore, the user then has both hands free to operate and calibrate the gauge 1. It should be understood that a user may also use other tools, such as a paper clip, to insert through the opening 333 to calibrate the gauge 1; however, doing so generally requires the user to hold the paper clip in one hand while calibrating the gauge 1 therein giving up one of his/her free hands.

Figure 16:
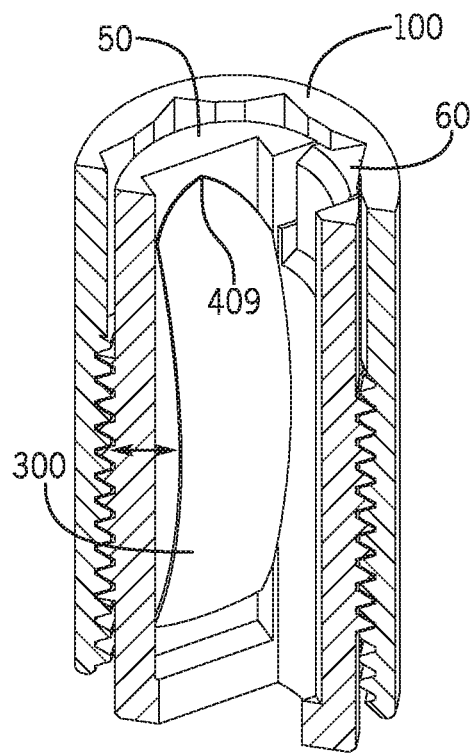
FIG. 16 illustrates a perspective cross-sectional view of the first unit nose piece and the second unit nose piece wherein the flat spring of the first unit nose piece is visible.

Referring now to FIG. 16, in an embodiment, a flat spring 300 may be utilized to center the scale bar 30 within the first unit nose piece 50 so as to provide a modest element of friction so that the scale bar 30 does not slide inadvertently when pressure is not being checked. Although FIG. 16 only illustrates one flat spring plate 300, a second, opposing, spring plate 300 would also be located on the other side of the scale bar 30 so that two spring plates 300 apply pressure to opposing sides of the scale bar 30. The flat spring 300 may have a top end which has a point 409. The point 409 of the flat spring 300 may focus an upward force of the flat spring 300 to a single location on the interior surface of the first unit nose piece 50 and, may therefore prevent sliding of the spring plate 300 above the top of the first unit nose piece 50. As a result the two spring plates 300 are inhibited from being dislocated from the interior of the first nose piece 50.

As shown in FIGS. 11 and 12, in an embodiment, the first unit nose piece 50 may rotate within the second unit nose piece 100 when the specialized tool 200A or 200B is utilized. In particular, the extended protrusions 60 are shown at the 10:00 and 5:00 position with respect to the second unit nose piece 100 in FIG. 11. Once the scale bar 30 is rotated (if the tool 201A or 210B is inserted on the gauge), the extended protrusions 60 of the first unit nose piece 50 are therein rotated, for example, to the 12:00 and 6:00 position of the second unit nose piece 100.

Figure 17:
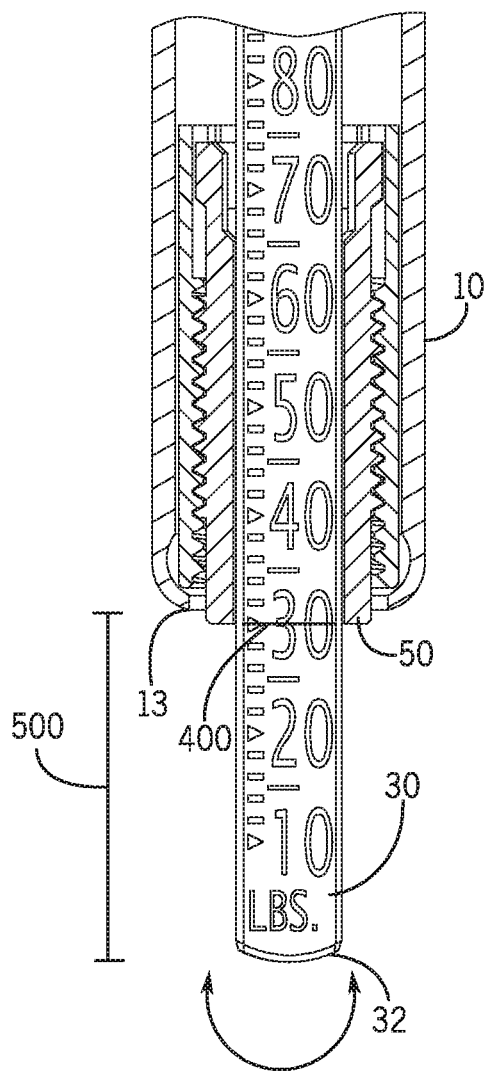
FIG. 17 illustrates the first nose piece of the present device in a first position with respect to the bottom of the main outer enclosure.
Figure 18:
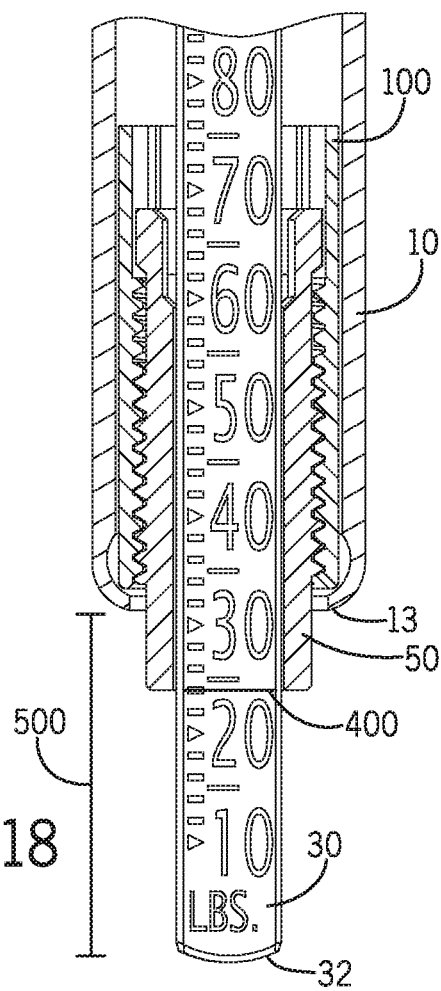
FIG. 18 illustrates the first nose piece of the present device in a second position with respect to the bottom of the main outer enclosure.

As shown in FIGS. 17 and 18, as the first unit nose piece 50 moves from the first position to a second position with respect to the second unit nose piece 100, the first unit nose piece 50 also moves vertically with respect to the second unit nose piece 100. More specifically, while the second unit nose piece 100 remains stationary with respect to the main outer enclosure 10 when the specialized tool 200A or 200B is utilized, the first unit nose piece 50 moves vertically with respect to the main outer enclosure 10.

During normal use of the gauge 1 without the specialized tool 200A or 200B being used, the first unit nose piece 50 is locked into the second unit nose piece 100 as a result of the triangular extended portions 60 being secured into the generally triangular points 126 of the second unit nose piece 100 by friction. Therefore, rotating the scale bar 30 rotates the first unit nose piece 50 which, in turn, rotates the second unit nose piece 100. As a result the three elements (scale bar 30, first unit 50 and second unit 100) all turn together in unison in normal use.

Figure 9:
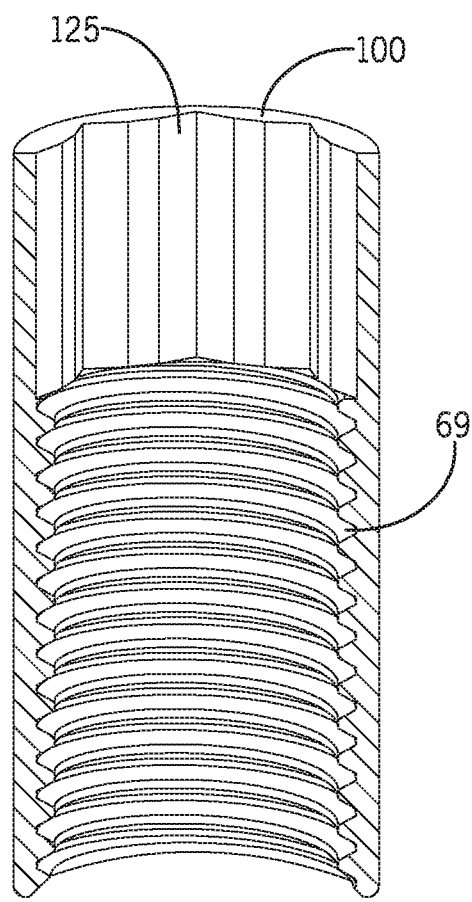
FIG. 9 illustrates a cross-sectional view of the interior of the second unit nose piece of the present calibratable tire gauge.
Figure 10:
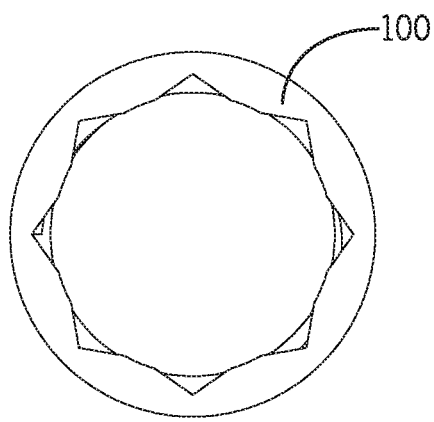
FIG. 10 illustrates a top view of the second unit nose piece of the present calibratable tire gauge.

The threads 59 of the first unit nose piece 50 rotate through corresponding threads 69 (FIG. 9) located within the interior of the second unit nose piece 100. During this rotation, the first unit nose piece 50 moves vertically upward or downward with respect to the second unit nose piece 100. This movement is illustrated in FIGS. 17 and 18. In particular, after the specialized tool 200A or 200B is inserted into the opening 250, a user turns the scale bar 30 and the first unit nose piece 50 may move downward (FIG. 18) or upward (FIG. 17) depending on the direction of twisting. The upward and downward movement is accomplished by the threads 59 and the corresponding threads 69 being slightly angled. In an embodiment, the first unit nose piece 50 may move, for example, ⅛ a rotation with respect to the second unit nose piece 100.

A pressure differential creates an inertial moment that moves the scale bar 30. The scale bar 30 movement is resisted by the spring 20, and the scale bar 30 comes to a resting point, yielding a measurement relative to the bottom 52 of the first unit nose piece 50 of the gauge 1. Prior art gauges create adjustability by allowing a way to calibrate the scale bar relative to a piston. In contrast, the present gauge 1 reverses that in that the present gauge 1 does not attempt to change the adjustability of the scale bar 30 relative to the piston 664, but instead the present gauge 1 allows for adjustment of the 'read' line 400 point at the bottom 52 of the first unit nose piece 50 of the gauge 1 instead.

The scale bar 30 moves vertically (parallel to the main outer enclosure 10) based on the pressure created by the pressure differential and pressure applied to the piston 664 and the resistance of the spring 20 through the air pressure of the tire 2. Therefore, the scale bar 30 moves independent from the first unit nose piece 50 in a vertical manner, but moves in unison with the first unit nose piece 50 in a horizontal manner (rotating) as shown in FIG. 17. By moving the first unit nose piece 50 downward as illustrated moving from FIG. 17 to FIG. 18 the 'read' line 400 point at the bottom 52 of the first unit nose piece 50 will read a different pressure despite the actual distance 500 the second end 32 of the scale bar 30 moves with respect to the bottom 13 of the main outer enclosure 10 being identical. This allows for easy calibration in the field.

An advantage of the present calibratable tire gauge 1 is that the present calibratable tire gauge 1 prevents the free spinning of the scale bar 30 from inadvertently moving the gauge 1 out of calibration and instead ensures that the present gauge 1 is only adjusted when desired. The friction required to twist the scale bar 30, the first unit nose piece 50 and the second unit nose piece 100 together as a unit within the main outer enclosure 10 is minimal, but the friction required to twist the first unit nose piece 50 but not the second unit nose piece 100 is much greater.

The friction needed to be overcome in order to rotate the first unit nose piece 50 with respect to the second unit nose piece 100 is the friction of the interacting threads 59, 69 and also the friction of the opening 125 of the second nose unit piece 100 (which may be an octagonal star-shape) with respect to the extended portions 60 of the first unit nose piece 50. This friction not only prevents unwanted calibration adjustments, but also serves to inform the user how much they are adjusting. Each 'click' (or turn) of the extended portions 60 with respect to the stationary openings 125 may create, in one embodiment, an audible sound. A click (or partial turn) might, for example, adjust the gauge by ¼ PSI which is easily audible or perceived by the user. The user is able to quickly adjust "by feel" and/or sound to the desired point. If they are out of calibration by +0.5 PSI, for example, 2 clicks will put it back to zero.

As stated above, normally, when the first unit nose piece 50, the second unit nose piece 100 and the scale bar 30 rotate in unison within the main outer enclosure 10, the gauge 1 is not calibrated. In order to calibrate, the second unit nose piece 100 needs to be immobilized. This is done by inserting the specialized tool 200A or 200B into the opening 333 in the main outer enclosure 10. The specialized tool 200A or 200B engages with the opening 250 on the second unit nose piece 100, immobilizing it. The first unit nose piece 50 can then be rotated by gripping the scale bar 30 and turning it by hand, clicking to the desired point. When the specialized tool 200A or 200B is then removed from the opening 333 of the main outer enclosure 10 and the opening 250 of the second nose piece 100, the first unit nose piece 50 and the second unit nose piece 100 and the scale bar 30 would again spin freely within the main outer enclosure 10 if rotated, and would not allow an inadvertent adjustment.

Another major advantage of the present gauge 1 is the quick-click feature. The second of the two key functions of the extended portion 60 of the first unit nose piece 50 is that it allows adjustment by feel. When the second unit nose piece 100 is immobilized by inserting the special tool 200A or 200B, the first unit nose piece 50 and scale bar 30 may turn, for example, in 45 degree increments, where the extended portion 60 of the first unit nose piece 50 clears the peak on the rim of the second unit nose piece 100, and then rests in the next valley. The user can feel each peak and valley, and each 45 degree rotation creates a ¼ PSI adjustment. If the user checks the gauge 1 against a benchmark and the gauge 1 differs from the benchmark by ¾ PSI, for example, three clicks quickly puts it spot on. The user would then check again against the benchmark to confirm, but then the process is complete. By comparison, with prior art gauges the user would need to check vs. the benchmark, then estimate how much to rotate a screw, then check again vs. the benchmark, and keep estimating and repeating the process until a match was achieved, which would be markedly slower. A quick click adjustment is a significant speed and accuracy advantage.

The reason the second unit nose piece 100 turns with the scale bar 30 most of the time isn't because of a lock, but that the coefficient of friction between the two nose piece units 50, 100 is greater than the coefficient of friction between the second unit nose piece 100 and the main outer enclosure 10. It is common for end users to turn the scale bar 30 as they are using the gauge 1 in order to read the indicia 33, and since calibration is adjusted anytime the first unit nose piece 50 and the second unit nose piece 100 rotate independently of one another, it is important to that the nose piece units 50, 100 rotate together to prevent unintentional adjustments to the calibration of the gauge 1. The triangular-shaped extended portions 60 aids in preventing unintentional rotation between the two nose piece units 50, 100. It is one of two key functions of the triangular-shaped extended portions 60, the other being a "click" indication when the first unit nose piece 50 is rotated with respect to the second unit nose piece 100.

Although embodiments of the invention are shown and described therein, it should be understood that various changes and modifications to the presently preferred embodiments will be apparent to those skilled in the art. Such changes and modifications may be made without departing from the spirit and scope of the invention and without diminishing its attendant advantages.

We claim:

1. A calibratable tire gauge comprising:
   a housing having a top, a bottom, a side having a length and defining a first axis line and an interior;
   a scale bar having a top end, a bottom end and a side wherein the scale bar moves along the first axis in a parallel manner within the interior of the housing;
   a first unit nose piece located at the bottom of the housing;
   a second unit nose piece located at the bottom of the housing wherein the first unit nose piece is at least partially surrounded by the second unit nose piece; and
   wherein the scale bar passes through the first unit nose piece.

2. The calibratable tire gauge of claim 1 further comprising:
   a washer located between the second unit nose piece and a spring wherein the spring and washer are located within the hollow interior of the housing.

3. The calibratable tire gauge of claim 1 further comprising:
   an opening channel located through the first unit nose piece wherein the opening channel extends from a first end of the first unit nose piece to a second end of the first unit nose piece wherein the shape of the opening channel mirrors the shape of a cross section of the scale bar.

4. The calibratable tire gauge of claim 3 wherein the opening channel is not circular.

5. The calibratable tire gauge of claim 1 further comprising:
   a threaded member located on an exterior side of the second unit nose piece;
   a threaded member located on an interior wall of the second unit nose piece; and
   a threaded member located on an exterior side of the first unit nose piece wherein the threaded member of the exterior side of the first unit nose piece mates with the threaded member of the interior wall of the second unit nose piece and therein the first unit nose piece rotates with respect to the second unit nose piece by the mating threaded members.

6. The calibratable tire gauge of claim 1 wherein the first unit nose piece moves along the first axis line while the second unit nose piece does not move along the first axis line.

7. The calibratable tire gauge of claim 6 wherein the first unit nose piece has a first end and a second end and wherein the second end of the first unit nose piece extends outside of the bottom of the housing in one orientation and wherein the second of the first unit nose piece moves with respect to the bottom of the housing.

8. The calibratable tire gauge of claim 5 further comprising:
   an extended portion extending from the exterior side of the first unit nose piece wherein the extended portion is temporarily secured within a corresponding opening located within the interior wall of the second unit nose piece.

9. The calibratable tire gauge of claim 8 wherein the extended portion is triangular-shaped.

10. The calibratable tire gauge of claim 1 further comprising:
    a piston located within the interior of the housing and above a top end of the scale bar.

11. The calibratable tire gauge of claim 8 wherein the extended portion of the exterior side of the first unit nose piece is temporarily secured within the corresponding opening of the interior wall of the second unit nose piece by friction and wherein a manual twisting of the scale bar allows the first unit nose piece to overcome the friction and allows the first unit nose piece to rotate with respect to the second unit nose piece which remains stationary when a tool is placed in an opening of the exterior of the second unit nose piece.

* * * * *